US005492631A

United States Patent [19]

Koester et al.

[11] Patent Number: 5,492,631

[45] Date of Patent: Feb. 20, 1996

[54] PROCESS FOR DEWATERING FINE-PARTICLE SOLIDS SUSPENSIONS USING DIALKYL CARBONATES

[75] Inventors: Rita Koester, Duesseldorf; Alfred Westfechtel; Walter Knoerr, both of Hilden, all of Germany

[73] Assignee: Henkel Kommnaditgesellschaft auf Aktien, Duesseldorf, Germany

[21] Appl. No.: 343,590

[22] Filed: Dec. 1, 1994

[30] Foreign Application Priority Data

Jun. 1, 1992 [DE] Germany .......................... 42 18 074.0

[51] Int. Cl.$^6$ ........................................ C02F 1/54

[52] U.S. Cl. ........................................ 210/729; 210/928

[58] Field of Search .................................... 210/928, 729, 210/728

[56] References Cited

U.S. PATENT DOCUMENTS

| | | | |
|---|---|---|---|
| 2,266,954 | 12/1941 | Bonnet et al. | 210/42.5 |
| 4,098,686 | 7/1978 | Petrovich | 209/166 |
| 4,925,587 | 5/1990 | Schenker et al. | 252/174.22 |
| 5,215,669 | 6/1993 | Koester et al. | 210/729 |

FOREIGN PATENT DOCUMENTS

| | | |
|---|---|---|
| 0417358 | 3/1991 | European Pat. Off. . |
| 0444760 | 9/1991 | European Pat. Off. . |
| 3723323 | 1/1989 | Germany . |
| 3918274 | 12/1990 | Germany . |

OTHER PUBLICATIONS

Erzmetall 30, 292 (1977).

Houben–Weyl, Methoden der organischen Chemie, 4th Edition, vol. E4, pp. 66 et seq.

*Primary Examiner*—Neil M. McCarthy

*Attorney, Agent, or Firm*—Ernest G. Szoke; Wayne C. Jaeschke; Daniel S. Ortiz

[57] ABSTRACT

Fine-particle solids suspensions can be dewatered by a process in which dialkyl carbonates corresponding to formula (I)

$$R^1-(OCH_2CH_2)_n-O-\overset{\displaystyle O}{\overset{\|}{C}}-O-(CH_2CH_2O)_mR^2 \quad (I)$$

in which $R^1$ and $R^2$ independently of one another represent alkyl and/or alkenyl groups containing 1 to 22 carbon atoms and m and n independently of one another stand for 0 or numbers of 1 to 10, are used as auxiliaries. The auxiliaries are readily biodegradable, extremely low-foaming and are distinguished by a low solidification point.

20 Claims, No Drawings

PROCESS FOR DEWATERING FINE-PARTICLE SOLIDS SUSPENSIONS USING DIALKYL CARBONATES

FIELD OF THE INVENTION

This invention relates to a process for dewatering fine-particle solids dispersions, in which dialkyl carbonates are used as auxiliaries.

BACKGROUND OF THE INVENTION

Large quantities of fine-particle solids of high water content accumulate in numerous branches of industry, for example in mining or in sewage treatment plants, and have to be dewatered before further processing or disposal as waste. For example, the dewatering of hard coal or coke is a central process in the preparation of coal-based fuels. It is often difficult to keep to the upper limits dictated by the market for the water content of these materials, for example because mined hard coal accumulates in very fine-particle form by virtue of the substantial mechanization of underground coal mining. At the present time, around 38% of mine-run coal consists of fine coal with particle diameters ranging from 0.5 to 10 mm; a further 14% consists of very fine coal with even smaller particle diameters.

RELATED ART

It is known that certain surfactants are suitable as auxiliaries for removing water from water-containing fine-particle solids suspensions, more particularly iron ore concentrates, quartz sands or hard coals, so that the residual water content can be reduced. Surfactant-based dewatering aids of the type mentioned above which have already been described include, for example, dialkyl sulfosuccinates [U.S. Pat. No. 2,266,954] and nonionic surfactants of the fatty alcohol polyglycol ether type [Erzmetall 30, 292 (1977)]. However, these surfactants are attended by the disadvantage that they foam to a considerable extent which gives rise to serious problems, particularly because the water is normally circulated in the preparation plants.

DE-A1-39 18 274 (Henkel) describes alkyl-terminated β-hydroxyalkyl ethers, so-called hydroxy mixed ethers, which are obtained by ring-opening of α-olefin epoxides with fatty alcohol ethoxylates and are used as low-foaming auxiliaries in the dewatering of solids suspensions. Although good results are obtained with these auxiliaries in the dewatering of solids, they have the disadvantage of unsatisfactory low-temperature behavior. Crystal formation can occur at temperatures of only 15° to 20° C., particularly where the auxiliaries are stored outside, with the result that the pumpability and flow behavior of the products deteriorate and their intended use is thus seriously impaired.

Accordingly, the problem addressed by the present invention was to provide a process for dewatering solids suspensions which would be free from the disadvantages mentioned above.

DESCRIPTION OF THE INVENTION

The present invention relates to a process for dewatering fine-particle solids suspensions, in which dialkyl carbonates corresponding to formula $$R^1-(OCH_2CH_2)_n-O-\overset{\overset{\displaystyle O}{\|}}{C}-O-(CH_2CH_2O)_mR^2 \quad (I)$$

in which $R^1$ and $R^2$ independently of one another represent alkyl and/or alkenyl groups containing 1 to 22 carbon atoms and m and n independently of one another stand for 0 or numbers of 1 to 10, are used as auxiliaries.

It has surprisingly been found that, by comparison with the known auxiliaries, the dialkyl carbonates to be used in accordance with the invention show distinctly better foaming and low-temperature behavior, more particularly lower solidification points, and equally good and, in some cases, even slightly improved performance properties.

DETAILED DESCRIPTION OF THE INVENTION

Dialkyl carbonates are known compounds which may be obtained by the relevant methods of preparative organic chemistry. They may be produced, for example, by subjecting dimethyl carbonate, preferably diethyl carbonate, to transesterification with a corresponding alcohol or alcohol ethoxylate in the presence of basic catalysts [cf. Houben-Weyl, Methoden der organischen Chemie, 4th Edition, Vol. E4, pages 66 et seq.].

Dialkyl carbonates suitable for use in accordance with the invention are, for example, mono- and di-transesterification products of dimethyl carbonate and, in particular, diethyl carbonate with saturated and/or unsaturated primary alcohols containing 6 to 22 carbon atoms and adducts thereof with 1 to 10 mol ethylene oxide. Dialkyl carbonates of formula (I), in which $R^1$ represents $C_{8-18}$ alkyl radicals, $R^2$ represents $C_2$ or $C_{8-18}$ alkyl radicals and n and m stand for 0 or numbers of 2 to 7 are particularly preferred by virtue of their low foaming and low solidification points. Dialkyl carbonates which have one short and one long alkyl group, for example mono-transesterification products of diethyl carbonate, have proved to be of particular advantage.

Commensurate with their use in accordance with the invention, the dialkyl carbonates corresponding to formula (I) must be dispersible in water. It is possible that dispersibility in water may not be satisfactory in cases where long-chain substituents $R^1$ and/or $R^2$ contrast with low values of the degree of ethoxylation n or m. However, the required dispersibility in water can readily be achieved by increasing the value for n or m within the limits mentioned above.

The dialkyl carbonates to be used in accordance with the invention may be used individually. However, it can be of advantage for dewatering certain solids to combine products differing in their chain length or their degree of ethoxylation with one another to utilize synergisms of their physicochemical properties. Similarly, it can be of advantage to use combinations of the dialkyl carbonates with other already known ionic or nonionic dewatering aids.

The dialkyl carbonates to be used in accordance with the invention support the dewatering of solids suspensions, are readily biodegradable and low-foaming and are distinguished by low solidification points. Accordingly, they are suitable for dewatering suspensions of various solids, such as for example iron ore concentrates, quartz sand, hard coal or coke. Another important application is the use of the dialkyl carbonates to be used in accordance with the invention as auxiliaries in the dewatering of solids suspensions accumulating in the recycling of wastepaper, for example in the deinking process or in the flotation of fillers.

In one advantageous embodiment of the process according to the invention, the dialkyl carbonates are used in quantities of 10 to 500 g, preferably in quantities of 100 to 400 g and more preferably in quantities of 150 to 350 g, based on the solids content, per tonne solids.

The following Examples are intended to illustrate the invention without limiting it in any way.

EXAMPLES

I. Dialkyl carbonates used (DAC)

$$R^1-(OCH_2CH_2)_n-O-\overset{\overset{\displaystyle O}{\|}}{C}-O-(CH_2CH_2O)_mR^2$$

TABLE 1

| | Composition | | | |
|---|---|---|---|---|
| DAC | $R^1$ | n | $R^2$ | m |
| A1 | n-$C_8$ | 2 | n-$C_8$ | 2 |
| A2 | n-$C_8$ | 4 | n-$C_8$ | 4 |
| A3 | n-$C_8$ | 4 | $C_2$ | 0 |
| A4 | n-$C_{12/14}$ | 2 | n-$C_{12/14}$ | 2 |
| A5 | n-$C_{12/14}$ | 4 | n-$C_{12/14}$ | 4 |
| A6 | n-$C_{12/18}$ | 2 | n-$C_{12/18}$ | 2 |
| A7 | n-$C_{12/18}$ | 7 | n-$C_{12/18}$ | 7 |
| A8 | i-$C_{13}$ | 3 | i-$C_{13}$ | 3 |
| A9 | n-$C_{16/18}$ | 5 | n-$C_{16/18}$ | 5 |
| A10 | n-$C_{16/18*}$ | 5 | n-$C_{16/18*}$ | 5 |

A9 was prepared from a technical saturated $C_{16/18}$ tallow fatty alcohol (Lorol® T, iodine value<5, Henkel KGaA, Düsseldorf, FRG) while A10 was prepared from a technical unsaturated fatty alcohol of the same chain length (HD-Ocenol® 50/55, iodine value 52, Henkel KGaA, Düsseldorf, FRG).

II. Dewatering tests in a bucket centrifuge

Quartz sand having the following particle size distribution was used for the dewatering tests:

| | |
|---|---|
| <125 μm | : 2.8% by weight |
| 125 to 200 μm | : 26.4% by weight |
| 200 to 315 μm | : 60.1% by weight |
| >315 μm | : 10.7% by weight |

The tests were carried out in a bucket centrifuge with which relative centrifugal forces of 15 to 2000 can be achieved. Perforated plates with sieve openings of 0.1×2 mm were used as the sieve lining. The dewatering aids were used in the form of aqueous solutions; all concentrations are based on the solids content of those solutions.

After the quartz sand had been weighed into the bucket of the centrifuge, the aqueous solutions of the dewatering aids were added and uniformly distributed. After a drainage time of 1 minute, the solid was dewatered for 30 s at a rotational speed of 500 r.p.m. The moist solids were then weighed out, dried to constant weight at 100° C. and the residual moisture content in %-rel was determined. All the test results are averages of double determinations. The results are summarized in Table 2.

TABLE 2

Dewatering tests in a bucket centrifuge

| | | Residual moisture [%.rel] | | |
|---|---|---|---|---|
| Ex. | DAC | E = 150 g/t | E = 250 g/t | E = 350 g/t |
| 1 | A1 | 5.6 | 5.8 | 5.0 |
| 2 | A2 | 5.0 | 5.1 | 4.8 |
| 3 | A3 | 5.2 | 5.0 | 4.7 |
| 4 | A4 | 6.2 | 6.7 | — |
| 5 | A5 | 6.3 | 6.1 | 5.7 |
| 6 | A6 | 6.8 | 6.4 | — |
| 7 | A7 | 5.3 | 4.8 | 4.2 |
| 8 | A8 | 6.5 | 5.5 | — |
| 9 | A9 | 5.9 | 6.3 | — |
| 10 | A10 | 6.3 | 6.0 | 5.8 |
| C1 | None | 7.0 | 7.2 | 7.1 |

Legend: DAC = Dialkyl carbonate
E = Quantity of dialkyl carbonate in g weighed in per t solids

We claim:

1. A process for dewatering a fine-particle solids suspension which comprises: adding to the suspension from 10 to 500 grams, per metric ton of solids, of a dialkyl carbonate of the formula $$R^1-(OCH_2CH_2)_n-O-\overset{\overset{\displaystyle O}{\|}}{C}-O-(CH_2CH_2O)_mR^2 \quad (I)$$

in which $R^1$ and $R^2$, independently of one another, represent an alkyl or alkenyl group containing 1 to 22 carbon atoms and m and n, independently of one another, stand for 0 or a number of 1 to 10.

2. A process as claimed in claim 1, wherein $R^1$ represents a $C_{8-18}$ alkyl group, $R^2$ represents a $C_2$ or $C_{8-18}$ alkyl group and n and m are independently 0 or a number of 2 to 7.

3. The process as claimed in claim 1, wherein the solid in the suspension comprises a member selected from the group consisting of iron ore concentrate, quartz sand, coal and coke.

4. The process of claim 1 wherein the fine-particle solids suspension is formed, in a process for recycling wastepaper.

5. The process of claim 1 wherein $R^1$ and $R^2$ are independently selected from the group consisting of the alkyl portions of the residues of primary saturated alcohols containing from 6 to 22 carbon atoms and the alkenyl portions of the residues of primary unsaturated alcohols containing from 6 to 22 carbon atoms.

6. The process of claim 1 wherein $R^1$ and $R^2$ are a $C_8$ alkyl group and n and m are 4.

7. The process of claim 1 wherein $R^1$ is a $C_8$ alkyl group, $R^2$ is an ethyl group, n is 4 and m is 0.

8. The process of claim 1 wherein $R^1$ and $R^2$ are each a mixture of $C_{12}$ to $C_{18}$ alkyl groups and n and m are 7.

9. The process of claim 2 wherein $R^1$ and $R^2$ are independently selected from the group consisting of alkyl portions of the residues of primary saturated alcohols containing from 6 to 22 carbon atoms and the alkenyl portions of the residues of primary unsaturated alcohols containing from 6 to 22 carbon atoms.

10. The process of claim 2 wherein $R^1$ and $R^2$ are a $C_8$ alkyl group and n and m are 4.

11. The process of claim 2 wherein $R^1$ is a $C_8$ alkyl group, $R^2$ is an ethyl group, n is 4 and m is 0.

12. The process of claim 2 wherein $R^1$ and $R^2$ are each a mixture of $C_{12}$ to $C_{18}$ alkyl groups and n and m are 7.

13. The process of claim 3 wherein $R^1$ and $R^2$ are independently selected from the group consisting of alkyl portions of the residues of primary saturated alcohols containing from 6 to 22 carbon atoms and the alkenyl portions of the residues of primary unsaturated alcohols containing from 6 to 22 carbon atoms.

14. The process of claim 3 wherein $R^1$ and $R^2$ are a $C_8$ alkyl group and n and m are 4.

15. The process of claim 3 wherein $R^1$ is a $C_8$ alkyl group, $R^2$ is an ethyl group, n is 4 and m is 0.

16. The process of claim 3 wherein $R^1$ and $R^2$ are each a mixture of $C_{12}$ to $C_{18}$ alkyl groups and n and m are 7.

17. The process of claim 4 wherein $R^1$ and $R^2$ are independently selected from the group consisting of alkyl portions of the residues of primary saturated alcohols containing from 6 to 22 carbon atoms and the alkenyl portions of the residues of primary unsaturated alcohols containing from 6 to 22 carbon atoms.

18. The process of claim 4 wherein $R^1$ and $R^2$ are a $C_8$ alkyl group and n and m are 4.

19. The process of claim 5 wherein $R^1$ is a $C_8$ alkyl group, $R^2$ is an ethyl group, n is 4 and m is 0.

20. The process of claim 5 wherein $R^1$ is a $C_8$ alkyl group, $R^2$ is an ethyl group, n is 4 and m is 0.

* * * * *

UNITED STATES PATENT AND TRADEMARK OFFICE

CERTIFICATE OF CORRECTION

PATENT NO. : 5,492,631

DATED : Feb. 20, 1996

INVENTOR(S) : Koester et al.

It is certified that error appears in the above-indentified patent and that said Letters Patent is hereby corrected as shown below:

On the title page, please delete item [22] and insert the following PCT information:

[22] PCT Filed: May 24, 1993
[86] PCT No.: PCT/EP93/01298
§ 371 Date: Dec. 1, 1994
§ 102(e) Date: Dec. 1, 1994
[87] PCT Pub. No.: WO 93/24799
PCT Pub. Date: Dec. 9, 1993

In Col 1, line 63, after "formula" please insert --(I)--.

Signed and Sealed this

Twenty-fourth Day of March, 1998

Attest:

BRUCE LEHMAN

Attesting Officer

Commissioner of Patents and Trademarks